Jan. 25, 1927.　　　　　　　　　　　　　　　　　　　1,615,790
O. V. FORBES ET AL
WIRE STRINGING FOR TENNIS RACKETS OR THE LIKE AND METHOD OF PRODUCING SAME
Filed Aug. 27, 1923

Inventor
Oswald V. Forbes
Wellesley M. C. Baber

By
Attorney

Patented Jan. 25, 1927.

UNITED STATES PATENT OFFICE.

OSWALD VERNON FORBES AND WELLESLEY MALCOLM COLBORNE BABER, OF LONDON, ENGLAND.

WIRE STRINGING FOR TENNIS RACKETS OR THE LIKE AND METHOD OF PRODUCING SAME.

No Drawing. Application filed August 27, 1923, Serial No. 659,694, and in Great Britain September 9, 1922.

This invention relates to a new wire product and to a process or method of manufacturing the same, and is designed to overcome the following disadvantages inherent in the so-called cat-gut, or in silk-gut, and to take the place thereof.

Cat-gut is not waterproof, but on the contrary, is very much influenced by climatic conditions, more particularly damp and heat, whereas, the new wire product, about to be described, is absolutely waterproof, being totally unaffected even by boiling water which would completely destroy cat-gut, or silk-gut. Catgut being an organic substance is readily liable to deteriorate, disintegrate, and decay under the influence of damp and (or) heat: the new product being a metallic substance has none of the disadvantages of an organic product. Again, catgut being an organic substance is readily attacked by ants, rodents, and the like, more especially in the tropics, whereas the new wire product is immune from the attacks of these insects, or animals. As is well known, damp or wet catgut not only tends to warp the frame of, say, tennis rackets, but is, itself, little more than half the strength when damp than when dry, and is therefore liable to snap, whereas this new wire product being unaffected even by boiling water, it tends to prevent the wood frames of rackets and like sporting implements from becoming warped through the never-ceasing tensional and torsional strains to which they are subject every 24 hours by reason of the differences of temperature and moisture between, say, mid-day and midnight, and between a dry day and a wet day. The strength of the new wire product is wholly unaffected by damp. Catgut being, as before stated, an organic substance it is impossible to secure uniformity of equality or strength, whereas the new wire product being a metallic substance, very great uniformity of quality and strength can be readily obtained. And lastly, the preparation of catgut is one of the most offensive and insanitary of manufactures, whereas the manufacture of the new wire products suffers from no such disadvantages.

The new wire product which, for purposes of description, we call "wire gut", or super gut, consists of any convenient number of lengths, or strands, of wire, say piano, or plough steel, treated in such a manner as to enable them to be screwed, wound, or intercoiled together, but so as to leave a hollow centre or, at it were, an air core, for the purpose of imparting to the "wire gut" a spring or resilience far greater than that possessed by the wire employed, and greatly in excess of the resilience possessed by any known wire, no matter what its composition. This product gives a far greater strength than catgut, and also a strength in excess of a number of wires of the same diameter and weight merely twisted together, this being due to the absence or reduction to a minimum of torsional strain, which strain, incidentally, destroys the temper and spring of the wire.

An essential object of our invention is to obtain, with our new wire product, the highest spring strength, or "drive", consistent with the weight of material used, as in certain cases spring strength is of highest importance, this being especially so, for example, in the case of tennis rackets where lightness in the head and "drive", or spring strength, is one of the most important factors.

Other and further objects will be apparent from the following description taken in connection with the drawing, in which—

Referring more particularly to the drawings:—

Figure 1:
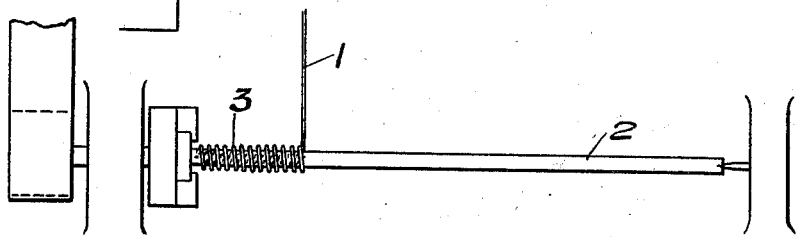
Figure 1 is a view showing the method of winding a wire upon a mandrel.
Figure 2:
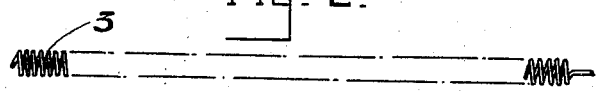
Figure 2 is a view showing a coil of wire as it is taken from the mandrel.
Figure 3:
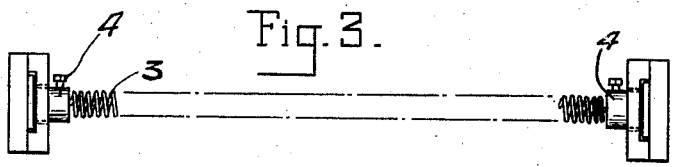
Figure 3 shows the mechanism preferably used for stretching the coil of wire, at the same time permitting the wire to uncoil to a certain extent.
Figure 4:
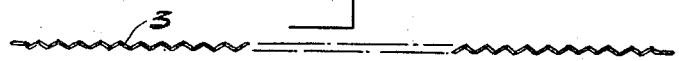
Figure 4 shows the completed strand of wire after the stretching operation.
Figure 5:
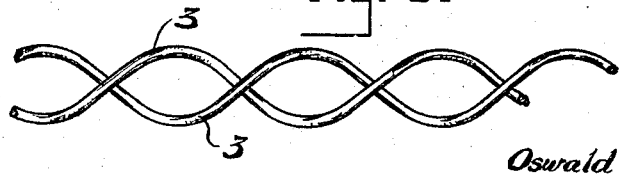
Figure 5 shows the method of interlocking groups of such strands to provide the resilient structure comprising the present invention.

In carrying out the invention, and according to a convenient mode of operation, a wire 1 is first wound or coiled, but not twisted, by any suitable means, on an appropriate mandrel 2 of very small diameter, say for instance, a length of wire, a length of catgut, or a slender rod, so that it forms a spiral or coiled spring 3. The wire spring, or coil, thus formed, is then removed from the mandrel and is attached by one or both its ends, preferably, but not necessarily, to a suitable revolving head, or heads 4, or other suitable device, which will permit it freely to revolve and untwist while being extended or stretched to, say, four or six times its initial length. This freedom of revolution during extension is advantageous but not absolutely essential. The extension, to a length suitable for the particular purpose for which it is to be used, or applied, may be effected by any convenient means, as for example by a stretching machine such as is partially shown in Figure 3 of the drawing. The coiled spring, in the act of extension, tends to revolve, while at the same time its circumvolutions undulations, or turns, are considerably lengthened. The extension of the coiled spring becomes a permanent extension and imparts to its coils not merely ordinary undulations, but undulations having a uniform spiral turn. As shown in Figures 4 and 5, the pitch of the undulations becomes steeper as the diameter of the internal or air core decreases, and the spring strength of the strand is greatly increased in comparison with its original spring strength. The original coiled extension spring of, say, twenty pounds strength and twenty feet length has now become, say, a sixty pounds spring of say one hundred and twenty feet in length.

The wire coil having been thus stretched, say to four or six times its initial length, is cut into a convenient number of equal lengths, say two or three, if a two or three strand gut is required, or more, if a gut of a larger number of strands is required, and said lengths are then screwed or made to engage or inter-coil with each other after the manner shown in Figure 5 of the drawings, thereby constituting the finished product. Any number of these wire lengths may be used to compose or constitute the "wire gut", or wire cord, or cable, of the required diameter, the central capillary hollow formed by intercoiling, screwing, or winding the lengths together constituting, as it were, a very fine air core around which the component wires lie.

According to another mode, and which we find advantageous, the "wire gut" may be produced by simultaneously winding, or coiling, upon a mandrel, as previously mentioned, several wires, and after removal from the mandrel of the spring so formed stretching it to the requisite length, thereby reducing the steps described in the previous mode to only two main operations instead of four or five.

This wire product or "wire gut" weight for weight, will be found fully equal, if not superior, in spring, resilience, or "drive" to the finest English catgut, when used for various purposes, as for instance to the stringing of rackets for lawn tennis, tennis, badminton, squash, lacrosse, or the like, and owing to its very much greater strength the wiregut employed, say, in rackets, need only be half the thickness of catgut, which still further increases its driving properties.

The "wiregut" thus produced may be made of rustless steel or, if desired, may be coated with any appropriate material, as for instance, rubber, gutta-percha, elastic paint, or varnish, or it may be enamelled, or plated, tinned, or galvanized, and instead of leaving a hollow between the screwed or intercoiled lengths to form an air core, this hollow may be filled with any appropriate substance, such as grease or graphite or oiled catgut.

A similar method or process of manufacture may be employed with advantage in the making of light wire ropes, hawsers, or cables for lifting, hoisting, staying, and like purposes and, weight for strength, will be found superior, owing to the impossibility of the rope, or the like, so made being subjected to a sudden strain even though the power or force be suddenly applied. A further advantage will be found in increased flexibility and lightness.

Wire coiled as first described and stretched to say double its length, and then cut into short pieces, may be advantageously used for making, as it were, spring nipples, and as a means for fastening the ends of spring, fan, and other belts.

Wire coiled and stretched to say double its length, or such other length as may be convenient for the particular purpose required, can also be used for "standard screwing" boots and shoes, also for packing-cases, and a variety of other purposes.

Having now described our invention, what we claim is:—

1. As an article of manufacture, a plurality of coiled lengths of wire, each of said lengths being stretched to permanently deform the coils thereof, and each of said lengths being interlocked with the coils of another length.

2. A stringing for tennis rackets or the like comprising a plurality of coiled lengths of wire, the coils of said lengths being stretched to permanently deform them, and the coils of said lengths being interlocked to form a group.

3. The method of making wire stringing for tennis rackets or the like which consists in forming a coil of wire; in next stretching such coil to permanently deform the convolutions thereof and simultaneously allowing the ends of such coil to freely revolve and untwist; and finally in interlocking adjacent coils to thereby define an elastic core surrounded by said interlocked spring coils.

4. The method of making wire stringing for tennis rackets or the like which consists in winding wire on a mandrel so as to form an extension spring; in then removing the coiled wire so formed and attaching it to a device for extending it to permanently deform the coils thereof whereby their pitch becomes considerably lengthened and the coils acquire a uniform spiral turn, the said device being adapted to permit the coiled wire to freely revolve and untwist while undergoing extension; in then cutting the elongated wire into suitable lengths, and intercoiling a plurality of such lengths one into another, the central hollow left after such intercoiling constituting an air core around which the component wires lay.

In witness whereof, we have hereunto signed our names.

OSWALD VERNON FORBES.
WELLESLEY MALCOLM COLBORNE BABER.